(12) United States Patent
McLemore et al.

(10) Patent No.: US 7,227,107 B2
(45) Date of Patent: Jun. 5, 2007

(54) SAFETY SHUT OFF FOR A PORTABLE COOKER

(76) Inventors: John D. McLemore, 105 Hickory Ct., Fortson, GA (US) 31906; Don McLemore, 450 Brown Ave., Columbus, GA (US) 31906

( * ) Notice: Subject to any disclaimer, the term of this patent is extended or adjusted under 35 U.S.C. 154(b) by 0 days.

(21) Appl. No.: 11/186,919

(22) Filed: Jul. 22, 2005

(65) Prior Publication Data

US 2006/0091137 A1    May 4, 2006

Related U.S. Application Data

(62) Division of application No. 10/371,194, filed on Feb. 24, 2003, now abandoned.

(60) Provisional application No. 60/358,726, filed on Feb. 25, 2002.

(51) Int. Cl.
*H05B 1/02* (2006.01)

(52) U.S. Cl. ............ 219/497; 219/494; 219/492; 219/481; 99/330; 99/335

(58) Field of Classification Search .......... 219/497, 219/506, 499, 494, 481, 415–419; 99/340, 99/339, 413, 325–333, 335
See application file for complete search history.

(56) References Cited

U.S. PATENT DOCUMENTS

| D31,630 S | 10/1899 | Racvek |
|---|---|---|
| D38,011 S | 5/1906 | Lawsos |
| D124,655 S | 1/1941 | Moran |
| D166,764 S | 5/1952 | Lux et al. |
| 3,060,606 A | 10/1962 | Peach |
| 3,083,272 A | 3/1963 | Dan |
| 3,132,432 A | 5/1964 | Yee |
| 3,166,242 A | 1/1965 | Shomaker |
| 3,688,978 A | 9/1972 | Goodhouse et al. |
| 3,731,059 A | 5/1973 | Wilson |
| 3,732,468 A | 5/1973 | Witt et al. |
| 3,746,250 A | 7/1973 | Goodhouse et al. |
| 3,827,345 A | 8/1974 | Wilson |
| 3,835,562 A | 9/1974 | Thistlethwaite et al. |
| 3,837,568 A | 9/1974 | Goodhouse et al. |
| 3,845,275 A | 10/1974 | Branson |
| 3,845,702 A * | 11/1974 | Mies ........................ 99/408 |
| 3,889,875 A | 6/1975 | Goodhouse |
| D243,950 S | 4/1977 | Ogasawara |

(Continued)

OTHER PUBLICATIONS

Printout of Judy Posner Collectibles, "A Fine Selection of Vintage Affordable Antiques and Collectibles", 7 pages, original date available unknown, dated Feb. 21, 2002.

(Continued)

*Primary Examiner*—Mark Paschall
(74) *Attorney, Agent, or Firm*—Smith, Gambrell & Russell LLP

(57) ABSTRACT

A cooking facilitator which is preferably portable and well suited for use as both a timer and cooking process facilitator having particular usefulness with cooking objects which have a characteristic associated with establishing a cooking time such as the weight of a turkey in the case of deep frying a turkey or the thickness of a steak in deep frying the same. A gas flow timer for shutting off an overheated or unattended cooking system is also featured.

19 Claims, 15 Drawing Sheets

U.S. PATENT DOCUMENTS

| | | | |
|---|---|---|---|
| 4,523,400 A | | 6/1985 | Seely |
| 4,669,209 A | | 6/1987 | Pollack |
| 4,681,463 A | | 7/1987 | Bendit |
| 4,730,284 A | | 3/1988 | Adams |
| 4,783,074 A | | 11/1988 | Kobayashi |
| RE32,820 E | | 1/1989 | Pollack |
| 4,829,981 A | * | 5/1989 | Burrell ................... 126/265 |
| 4,875,886 A | | 10/1989 | Sung |
| 4,986,013 A | | 1/1991 | Pollack |
| 5,040,318 A | | 8/1991 | Ryan |
| D321,831 S | | 11/1991 | Piarulli et al. |
| 5,209,218 A | * | 5/1993 | Daneshvar et al. ...... 126/374.1 |
| 5,398,376 A | | 3/1995 | Pollack |
| 5,402,976 A | | 4/1995 | Pollack |
| 5,590,584 A | | 1/1997 | Ahn |
| 5,608,383 A | | 3/1997 | Neil |
| 5,632,614 A | | 5/1997 | Consadori et al. |
| 5,690,094 A | * | 11/1997 | Sheinfeld et al. ........ 126/374.1 |
| 5,785,511 A | | 7/1998 | Shah |
| 5,813,321 A | | 9/1998 | Bourgeois |
| 5,896,810 A | | 4/1999 | Barbour |
| 5,910,206 A | * | 6/1999 | McNamara ................. 99/330 |
| 5,933,391 A | | 8/1999 | Uptegraph |
| 5,996,572 A | | 12/1999 | Ilagan |
| 6,047,694 A | | 4/2000 | Landstrom et al. |
| 6,155,160 A | | 12/2000 | Hochbrueckner |
| 6,161,320 A | | 12/2000 | Peterson |
| 6,314,869 B1 | * | 11/2001 | Bourgeois, Jr. ............. 99/340 |
| D474,120 S | | 5/2003 | McLemore et al. |
| 6,636,458 B1 | | 10/2003 | Uptegraph |

OTHER PUBLICATIONS

Printout of "Once Upon a Recipe Egg Timer", (Amazon.Com), 3 pages, original date available unknown-dated Feb. 21, 2002.

Plast-O-Matic Valves, Inc., "The What, How, Where, and Why of Solenoid Valves", dated Feb. 24, 2003, pp. 1-4.

Smart Sensor Requirements for 'Second Generation' Seismic Gas Shut-Off Valves, by Douglas P. Arduini, pp. 1-18, not dated.

Printout of Advent Product Development, 2 pages, Patent Pending (Automatic Fuel Shutoff) with Dec. 9, 2003 code indication.

* cited by examiner

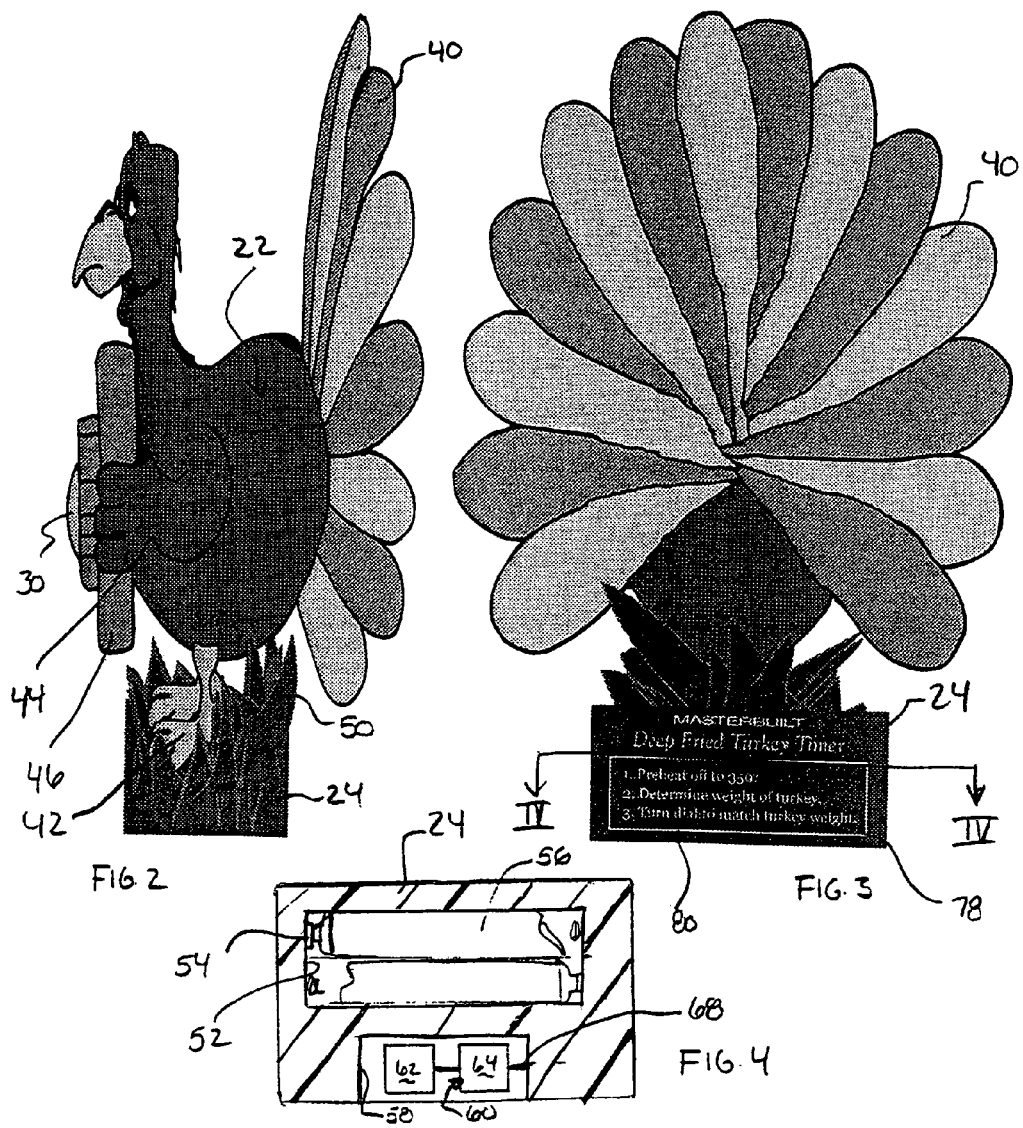

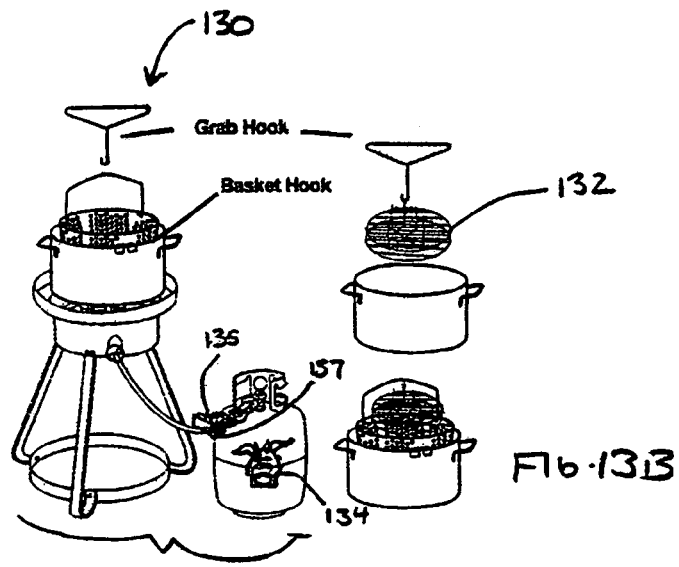
FIG. 13B
FIG. 13A
FIG. 14B
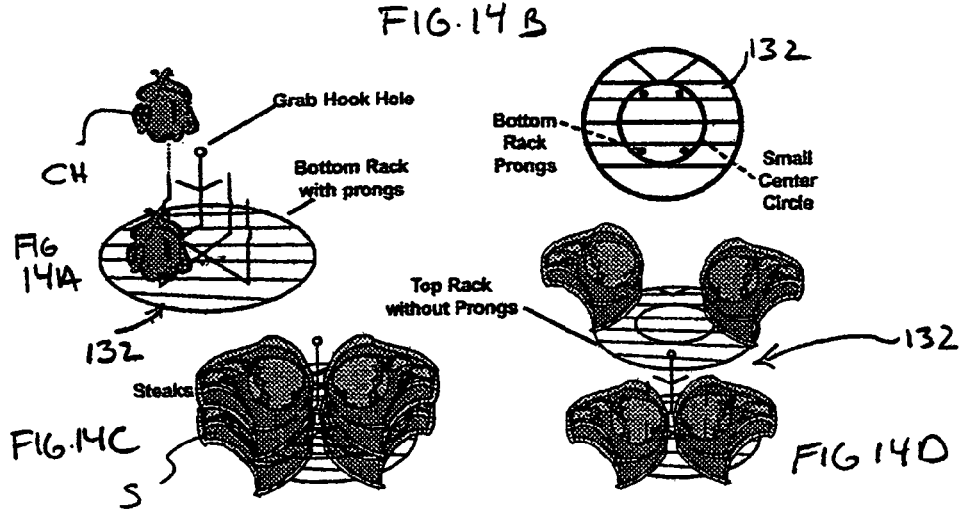
FIG. 14A
FIG. 14C
FIG. 14D
FIG. 15
Cooking Time for 1 to 4 steaks:
| Thickness | Medium Rare | Medium | Well Done |
|---|---|---|---|
| 1/2" | 1 Minute | 2 Minute | 3 Minute |
| 3/4" | 2 Minute | 3 Minute | 4 Minute |
| 1" | 3 Minutes | 4 Minute | 5 Minute |
| 1 1/4" | 4 Minute | 5 Minute | 6 Minute |
| 1 1/2" | 5 Minutes | 6 Minute | 7 Minute |

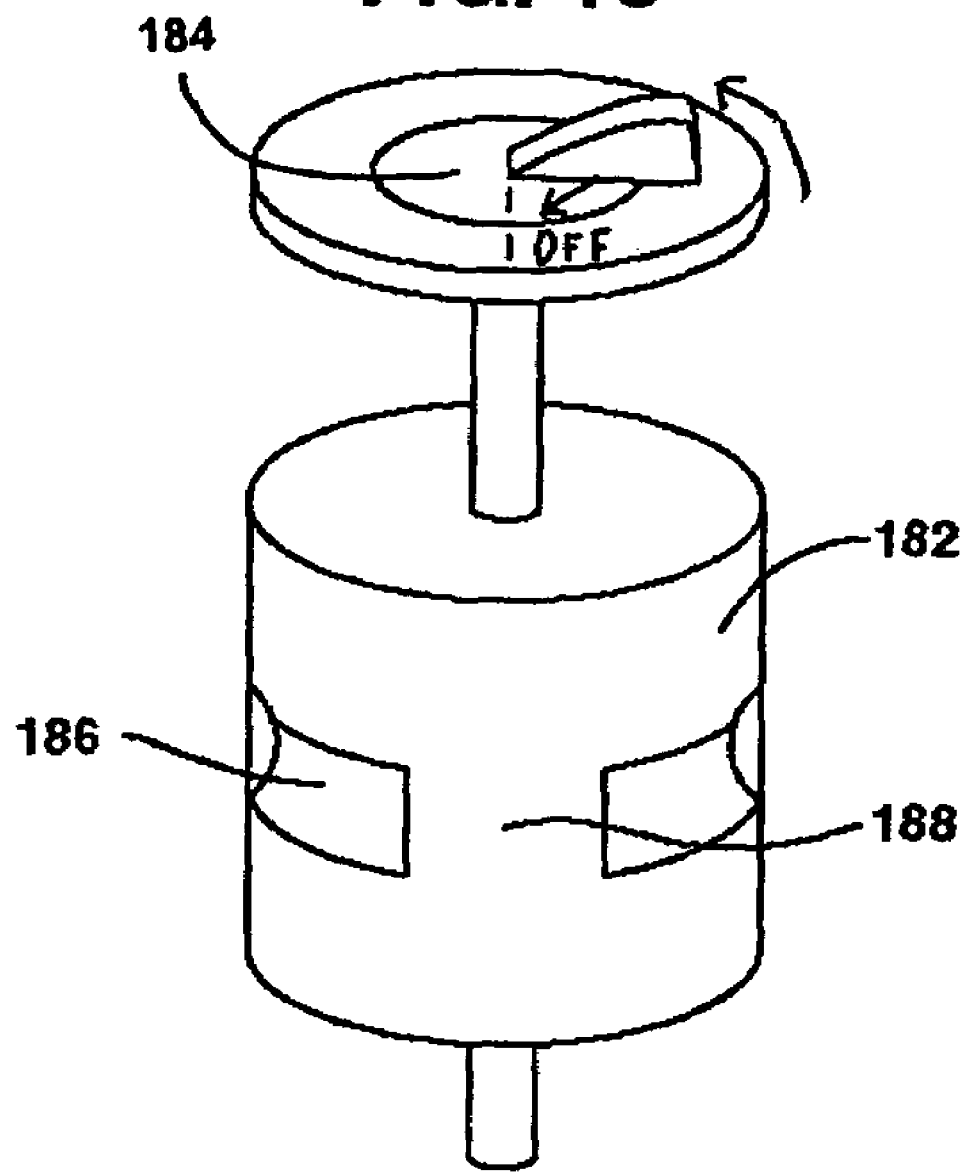

SAFETY SHUT OFF FOR A PORTABLE COOKER

REFERENCE TO DISCLOSURE DOCUMENT

Reference is made to disclosure document number 512113 filed by inventor Don McLemore on May 28, 2002 for a GAS FLOW TIMER, and its contents are incorporated herein by reference.

REFERENCE TO PROVISIONAL PATENT APPLICATION

Reference is made to provisional application 60/358,726 filed Feb. 25, 2002 and entitled COOKING FACILITATOR, and for which priority under 35 USC 119(e) is claimed. Provisional application 60/358,726 is also incorporated herein by reference.

CROSS REFERENCE TO RELATED APPLICATION(S)

This application is a divisional of U.S. Ser. No. 10/371,194, filed Feb. 24, 2003, which application is incorporated herein by reference and is currently abandoned.

FIELD OF THE INVENTION

The present invention is directed at a cooking facilitator with countdown timer means and means for providing food characteristic information relevant to cooking time (such as food item weight and/or thickness) and means for providing or setting the appropriate cooking time based on pre-established parameters such as a formula, memory table or the like. The cooking facilitator is preferably portable so as to render it well suited for use in an outdoor cooking environment as in the case of deep frying a turkey. Also, the present invention preferably features a configuration which is associated with the food item well suited for use with the facilitator such as a turkey configuration for deep frying turkeys. The facilitator also includes a signal generator which signals completion of a set cooking time with the signal preferably being of a type also associated with the food item being cooked. The invention is also directed at a gas flow timer.

BACKGROUND OF THE INVENTION

There exists countdown timers that are intended for indoor kitchen use while the user is cooking or baking. For example, "egg timers" are well known with the earlier versions often having a mounted hour glass design which was turned to initiate the timing of the egg boiling. There is also known mechanical countdown timers such as that available from Lux Products Corporation of Mt. Laurel, N.J., under the registered trademark MINUTE MINDER.®. FIG. 11 of the present application illustrates a convention mechanical timer, labeled "PRIOR ART". It is similar to the above noted timer available under the registered trademark MINUTE MINDER.®. Timer 100 is a mechanical timer that operates based on mechanical coupling between a main spring and a gear train (not shown). Tick marks 102 and numerals 104 are positioned around the perimeter of a centrally mounted knob 106 to indicate a countdown time. Clockwise rotation of knob 106 increases the set countdown time and counter-clockwise rotation reduces the set countdown time. In operation, the user of timer 100 would turn knob 106 clockwise until a desired countdown time is aligned with a marker 108 on the timer's face. Upon release, the main spring and gears turn knob 106 in the counter-clockwise direction until "0" reaches the mark 108 and a bell rings. During such operation, the user could rotate knob 106 to increase or decrease the remaining time, if desired. An additional example of a spring biased "egg timer" can be seen in DE 19904968. A further example of a mechanical countdown timer can be seen in U.S. Pat. No. 4,783,074 which is used in association with an action toy game. The timer mechanism is a conventional timer device which is manually settable for various time periods through use of a control lever that it is rotatable around a sleeve with the outer portion of the lever traveling in the slot. The control lever is integrally formed with a downwardly extending finger and a fan gear, and it is attached to a drive spring which is operative for resiliently returning the control lever to an unwound or unset position.

There has also been introduced cooking timers that feature added electronics in place of at least some of the mechanical components such as the above described MINUTE MINDER® timer. An example is found in U.S. Pat. No. 5,933,391 which is incorporated herein by reference. U.S. Pat. No. 5,933,391 features an LCD display, piezo buzzer and an electric contact/logic control circuitry with microprocessor.

In the toy field there is found examples of sound emitting means which include integrated circuit chips connected to a speaker as shown in, for example, U.S. Pat. No. 4,875,886. Prior art sound emitting means include means which play back a stored sound pattern, such as a melody or a voice; the stored sound pattern being stored on magnetic tape, on an optical or magnetic disk, or electronically in a circuit.

There also exists a variety of cookware, both indoor and outdoor. These include cookware for deep frying, steaming and boiling food items. Deep frying large poultry items such as whole turkey with an outdoor cooking apparatus has gained in popularity as a way of cooking which is both quicker than baking and less susceptible to drying out the food. Outdoor cooking apparatuses often include a stock pot which is received on a gas (e.g., propane) cooker stand. In deep frying a whole turkey, a pot that is sufficiently sized to receive a whole turkey is utilized in conjunction with a sufficient level of cooking oil. To avoid exposure to the oil (e.g. splashing or actual contact), turkey securement arrangements have been developed, such as those shown in U.S. Pat. Nos. 5,896,810 and 5,813,321. A further example of a cooking system well suited for use in deep frying a turkey can be seen in the "TURF N' SURF" cooking system of Masterbuilt Manufacturing Inc. of Columbus, Ga., and reference is made to U.S. Ser. No. 10/005,311 filed Dec. 7, 2001 which is incorporated by reference herein and illustrates a cooking apparatus of Masterbuilt Manufacturing Inc.

SUMMARY OF THE INVENTION

The present invention provides a cooking facilitator which is preferably portable and well suited for use as both a timer and cooking process facilitator having particular usefulness with cooking objects which have a characteristic associated with establishing a cooking time such as the weight of a turkey in the case of deep frying a turkey or the thickness of a steak in deep frying the same, to name a few. The present invention provides means for providing to an operator cooking time information through the input of a food characteristic such as the input of, for example, the weight of an object to be cooked which has a weight associated cooking time. A preferred embodiment of the present invention features a pre-set time/weight dual scale which allows an operator to set/visualize a cooking time period by simply adjusting the timer to a weight value of the object to be cooked, which is often readily ascertainable from the food packaging. For example, most whole poultry items such as whole turkeys are sold by the pound and this information is clearly set out on the packaging.

The present invention is preferably a portable device to facilitate use with outdoor cooking environments such as deep frying whole turkeys. The source of power can be either solely mechanically based such as through the winding of a spring for time countdown and/or time completion signal generation, or can be battery based for either or both of the timer countdown means and signal generation means. The means for interrelating the cooking time with the a food characteristic (e.g., weight or thickness) of the object being cooked is either preset and fixed such as in a non-adjustable dual scale indicia arrangement featuring a time scale and particular type of cooking object weight scale with the interrelationship being, for example, formula based or predetermined through testing. For example, a turkey fryer weight scale which is based on the following formula:

(Product lbs Weight×3 Minutes )+5 minutes=total cooking time

An example of a fixed scale arrangement features a time scale with interrelated weight scale in one unit type (e.g., pounds) and a second unit type (e.g., grams) and/or a multi-food type scale such as one featuring a time scale in conjunction with a weight scale for a first type of food (e.g. a turkey) and a second fixed scale for a second type of food type (e.g. chicken, beef and/or pork products). The time scale is based on the maximum potential cooking time anticipated for the product(s) for which the invention is intended for use. For instance, in view of the quicker cooking times associated with deep frying turkeys a scale that is less than 90 minutes (and more preferably less than 80 and more than 50 minutes) with minute intervals designated and groupings identified (e.g. 5 minute intervals) would be well suited for the purposes of the present invention. Also, the means for interrelating cooking time and cooking weight with respect to the timer of the invention can be based solely on weight indicia with the timing component being a set feature of the timing mechanism of the present invention (e.g. in the case of a mechanical timer, the gearing and spring types involved relative to the movable or adjustable adjustment means such as a lever or dial without the need for a displaying of the time scale).

The present invention also features an adjustable cooking facilitator suited, for example, a plurality of food types such as through use of a mechanical adjustment feature such as a replaceable indicia scale (e.g., a plurality of scales which can be interchangeably positioned relative to a fixed time scale with indicia indicating the type of food product associated with that scale). An alternate embodiment of the invention includes adjustment means which are electronically based. An example of an electronically based adjustment system of the present invention includes a stored group of cooking time formulas or a library of correlated cooking time and characteristic values whereupon the entry of a weight provides for the determination of the cooking time for an inputted food product (or vice versa for situations where the desired product weight information is desired such as prior to purchase and the desired cooking time is known). Suitable display means can be provide relative to both inputable information and any information output as well as toggle or option switching means relative to different cooking products or other options to be afforded by the facilitator. In a formula based system, the formula can also include one or more additional variable inputs such as the cooking temperature to be used (e.g. an option of cooking within a temperature range which may be suitable for a particular type of cooking method and product; an example of which is 350 to 375° F. for turkey frying).

The present invention also preferably includes a signal generator for signaling when a time period has expired. This can include a variety of signaling means which can be picked up by the cook's senses. Examples include, for instance, sound generation, mechanical movement, light signals and/or smell generation. The signal generation can be a one time signal that either can be continuous until the operator shuts off or designed to run through a predetermined period before shut off or can be a repeating signal with a time delay in between each signal generation period.

The present invention also includes a preferred embodiment which interrelates the timer support and/or signal with a particular type of food item to be cooked associated or most associated with the timer of the invention. As an example, a timer to be utilized with outdoor deep fat turkey frying that includes a representation of a turkey (preferably a comical or non-realistic depiction of a turkey) with a support base. The timer device in a preferred embodiment features the turkey configuration with the timing means and/or weight information providing means held by the turkey configuration. The invention features a variety of means for such holding including a fixed/integral relationship such as in a unitary shell molding technique with time and weigh indicia applied (e.g. painted) or provided as an integral component such as integrally molding the information in the turkey configuration (preferably a plastic hollow shell) with an adjustable dial supported by the shell. Alternately, the timer means can be held in a pocket or otherwise releasably attached for removal (this removal and potential for reinsertion or reattachment also provides a means for altering or adjusting the type of timer being utilized). A further example would be the depiction of a cow, steer or bull (preferably exaggerated/comical) configuration with a countdown timer included.

The base can also include one or more cavities under the present invention providing battery receiving means and/or signal generation means and associated wiring. For example, a two battery support cavity with corresponding contacts and wiring to a signal generation means such as a sound producing IC chip and speaker. If mechanical movement or light generation is involved (either in place of or in conjunction with the sound generation), than a motor and associated mechanical linkages and/or gearing can be provided (e.g., internalized within the shell or main body of the configuration). Similarly the wiring or the like for the light generating means can be internalized and used in conjunction with internally and/or externally lighting such as LED's.

A preferred embodiment of the invention also preferably features sound generation which is associated with the configuration such as the noise a turkey makes for the above noted turkey configuration noted above. Also, while a real or realistic representation of the noise a turkey makes can be utilized (e.g. an actual recording), the present invention, particularly when a comical turkey representation is involved, features a non-real or not entirely realistic sound such as a "gobble-gobble" sound generation which is producible by an IC chip and speaker combination or some other form of sound generation. As a further example, the "moo" sound associated with beef cattle. Also, if mechanical movement is involved; this too is also preferably interrelated with the food type most intended (such as tail feather movement and/or beak movement associated with a turkey, or the lowering of a long steer's head and horns with a stamping of a hoof).

BRIEF DESCRIPTION OF THE DRAWINGS

FIG. 2 illustrates a right side elevational of the embodiment of FIG. 1;

FIG. 3 illustrates a rear elevational view of the embodiment of FIG. 1;

FIG. 4 shows a cut away view taken along cross-section line IV-IV in FIG. 3;

FIGS. 13A and 13B show a system like that in FIG. 12, but in conjunction with a rack for deep frying a plurality of cooking items at once;

FIGS. 14A-14D show the association of multiple cooking items on the rack of FIG. 13;

FIG. 15 shows an illustration of a food characteristic (thickness) together with a sub-characteristic category of preferred level of cooking;

FIG. 18 shows an alternate valve setting means combination;

DETAILED DESCRIPTION OF THE PREFERRED EMBODIMENTS

Figure 1:
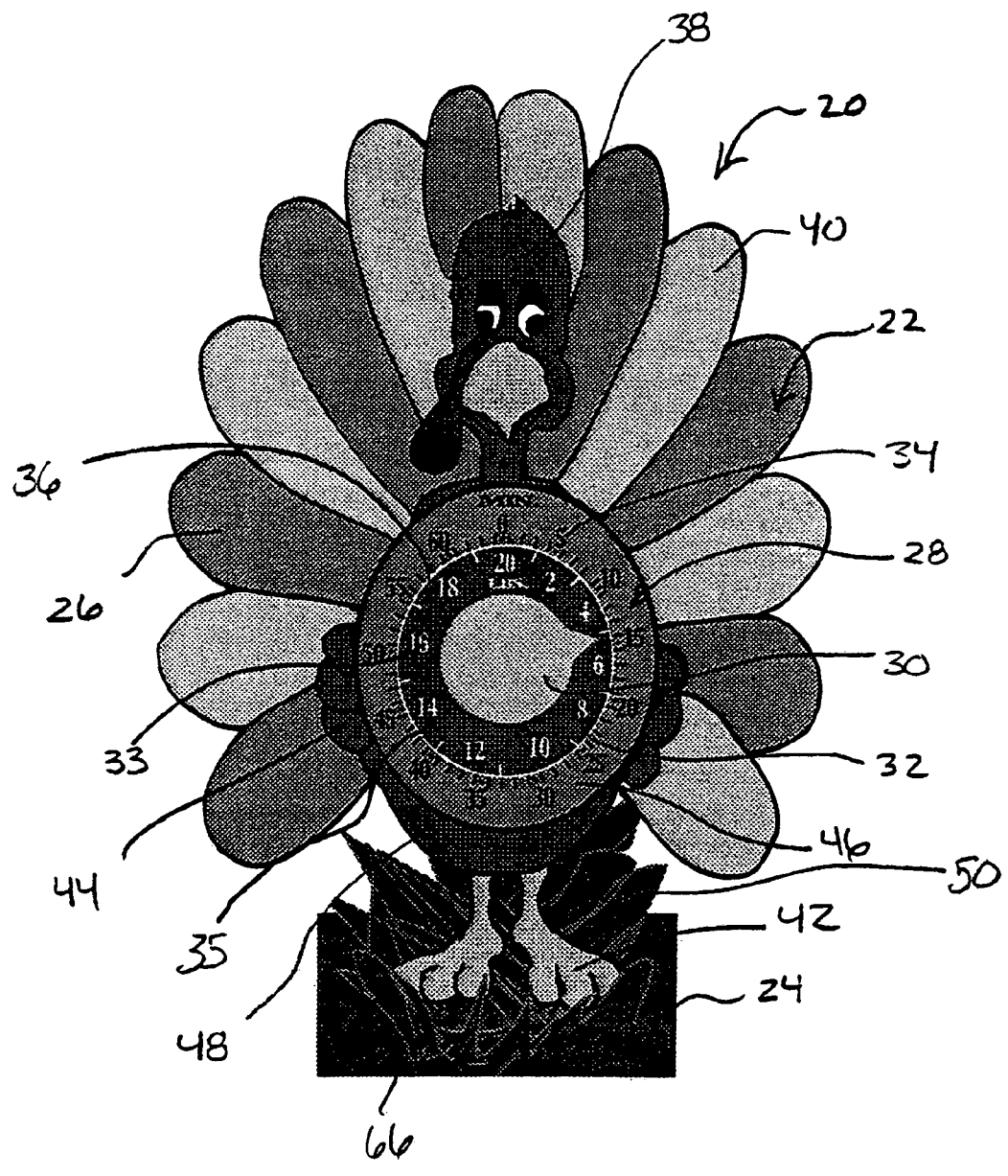
FIG. 1 illustrates a front elevational view of a first embodiment of the cooking timer of the present invention.

Under the present invention cooking is facilitated by taking much of the guesswork out of the cooking process and ensuring both a proper cooking time and avoiding overcooking. FIG. 1 illustrates a view of one embodiment of the cooking facilitator 20 of the present invention which features main body 22, which, in this embodiment, comprises base 24 and (representative) configuration 26. The cooking facilitator 20 of the present invention further comprises countdown timer device or cooking time setting means 28 which, in the illustrated embodiment, includes food characteristic setting means 32 preferably provided in conjunction with time designation means 34.

In the embodiment shown in FIG. 1, food characteristic setting means 32 includes rotatable dial 30 and a fixed indicia scale 33 which, for this embodiment, includes a weight scale (e.g., lbs) having a weight range that has a maximum level that is established in association with a maximum or upper point of the characteristic range for a particular type of food product which is illustrated by 20 lbs in the illustrated embodiment, as 20 lbs represents the recommended maximum weight of the cooking system (see FIG. 12, for example) associated with the cooking facilitator 22. The characteristic range can be provided in a variety of ways with FIG. 1 showing the fixed weight scale with one pound ticks with every other one illustrating a specific pound number. Further, as also shown in FIG. 1, cooking setting means 28 preferably includes time designation means 34 in conjunction with food characteristic setting means 32 with the illustrated embodiment showing a minute based scale having an upper limit falling between one hour and two hours (e.g., 65 minutes with minute tick markings and written 5 minute interval designations).

The present invention also features means for interrelating 35 a food characteristic with the countdown device, which in the FIG. 1 embodiment comprises the relative placement of the time scale with the weight scale such that by setting a desired point in the characteristic range the cooking time is represented and established relative the time period to be count down. For example, a formula based equation that provides a proper cooking time/food product characteristic interrelationship such as that shown in FIG. 1 can be utilized, and through the associated time and weight values displayed there can be determined along a radial line with the assistance of dial point 36 and a common circumferential range border line 36 the interrelationship between the weight and countdown time period for that weight.

In a preferred embodiment configuration 26 is a representative configuration which provides a correlation with the food product such as the representation of a turkey as shown in FIG. 1 with, for instance, turkey head with beak 38, plumage feathers 40, feet 42 and wings 44. Representative configuration 26 further illustrates indicia display platform 46 provided on mid-body 48 of the configuration and on which dial 30 is mounted and on which is provided the fixed indicia of the food characteristic setting means 32 and time designation means. Feet 42 extend up from base 24 with base 24 being of sufficient size to provide non-tip over support surface mounting, although the configuration is preferably generally symmetrical and balanced in weight in the left to right direction relative to FIG. 1.

FIG. 1 further illustrates base 24 having an environmental representation portion in the form of grass blades 50 in the illustrated embodiment. In a preferred embodiment, configuration 26 is formed of plastic in a single step molding process (avoidance of undercuts etc.) and preferably with at least a partially hollow configuration with internal mounting region(s) for portions of the countdown timer mechanism if not self-contained or a cavity for receiving a self-contained countdown timer.

With reference to FIGS. 2, 3 and 4, there is illustrated a side view, back view and cut-away IV-IV section view, respectively. As shown best in FIGS. 1, 3 and 4, base 24 also preferably includes a cavity region for receiving electrical components such as battery cavity 52 in which extends suitable battery contacts 54 and which is sized to receive a suitable power source 56 such as one or more batteries (two shown in the figure). FIG. 4 further illustrates cavity 58 for receiving some of all of signal generation means 60, which in FIG. 4 is illustrated by a sound generation integrated chip 62 and speaker 64. These elements can either be made as an integral module or interconnected such as by circuitry connections including wiring 68 or other electrical communication means. The circuitry is preferably interconnected with the countdown timer as the means to trigger the initiation of signal generation (e.g., an electrical contact arrangement between the turn dial and the wiring leading to the chip or other processing means to control the signal generation). FIG. 1 also illustrates speaker sound holes 66 formed in the front face of base 24 or in a face plate secured thereto to help extend the range and volume of the signal generation.

FIG. 4 illustrates a preferred embodiment which includes an electronic power source and signal generation means, although the present invention also contemplates alternate signal generation means (e.g., a bell or the like in association with the countdown timer either mechanically sounded or sounded upon timer countdown completion such as upon a sensed electrical contact by the moving timer dial).

The signal generation means 60 of the present invention can include a variety of signaling means which can be picked up by the cook's senses. In addition to the sound generation means noted above further examples include, for instance, mechanical movement, light signals and/or smell generation. The signal generation can be a one time signal that either can be continuous until the operator shuts off or designed to run through a predetermined period before automatic shut off or can be a repeating signal with a time delay in between each signal generation period. The additional signal generation embodiments described above can either be used alone or in any combination.

If mechanical movement or light generation is involved (either in place of or in conjunction with sound generation, for example), than a motor and associated mechanical linkages and/or gearing can be provided (e.g., internalized within the shell or main body of the configuration). Similarly the wiring or the like for the light generating means can be internalized and used in conjunction with internally and/or externally positioned lighting such as LED's.

The base provides a good location for storing any electrical components, but alternate arrangement are also contemplated including reliance on one or more cavities in the mid-body 48 or some alternate location or relationship. Also while a preferred embodiment of the present invention is a portable non-plug in type device, an alternate embodiment of the invention can include an electrical plug in arrangement (with suitable electronic circuitry designed for household plug in use). The preferred portable nature of the present invention and the use of micro-electronics allows main body to relatively small (e.g. 2 to 12 inches in height). A larger alternate embodiment of the present invention is also contemplated e.g. 12 inches to 3 feet which can be provided as a yard decoration adjacent an outdoor cooking area. In such case the relative timer/main body dimensions can be altered and different material choices may be more appropriate to handle continued presence in the outdoor environment (chosen amongst the large assortment of various material available in addition to plastics such as ceramics, cement, metals, etc.,)

A permanently outdoor cooking facilitator can include additional weather protection features such as added sealing and modified positioning of any holes such as an all internal or under region on the main body for the speaker holes 66. The weight of the device is also chosen in association with its size and intended use (e.g., a hollow plastic large cooking facilitator can be provided with extra base ballast or means for adding ballast (e.g., a sand pouring cavity))

The signal generation can be a one time signal that either can be continuous until the operator shuts off or designed to run through a predetermined period before shut off or can be a repeating signal with a time delay in between each signal generation period.

Figure 5:
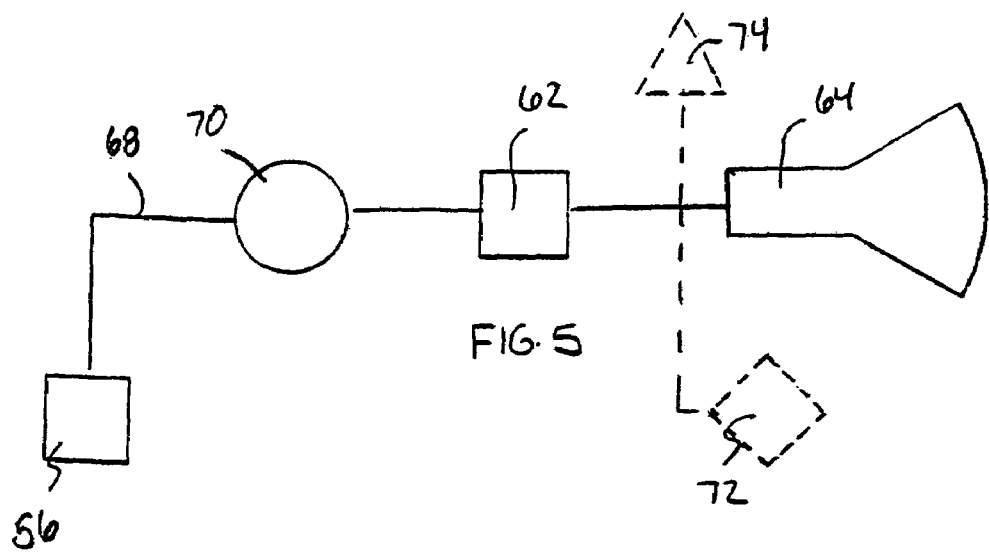
FIG. 5 shows a schematic illustration of the signal generation system of the present invention.

FIG. 5 shows a schematic illustration of one signal generation system of the present invention. As shown in FIG. 5, power source 56 is in communication with signal generation chip 62 with an electrical switch or other suitable signal generation trigger means represented by reference number 70 which can include, for example, the above described countdown timer with circuitry contact (a specific contact not shown).

FIG. 5 also shows a representation of additional signal generation means with a mechanical driver 72 and light system 74 being shown. As noted, the signal generation preferably includes a sound generation means, although a non-sound based signal generation used alone or in combination with another signal generation means (including a sound generation means) is also part of the present invention. The driver 72 and light system 74 are shown in dashed lines as a general illustration of the variety of possible signal arrangements contemplated for the present invention.

Figure 7:
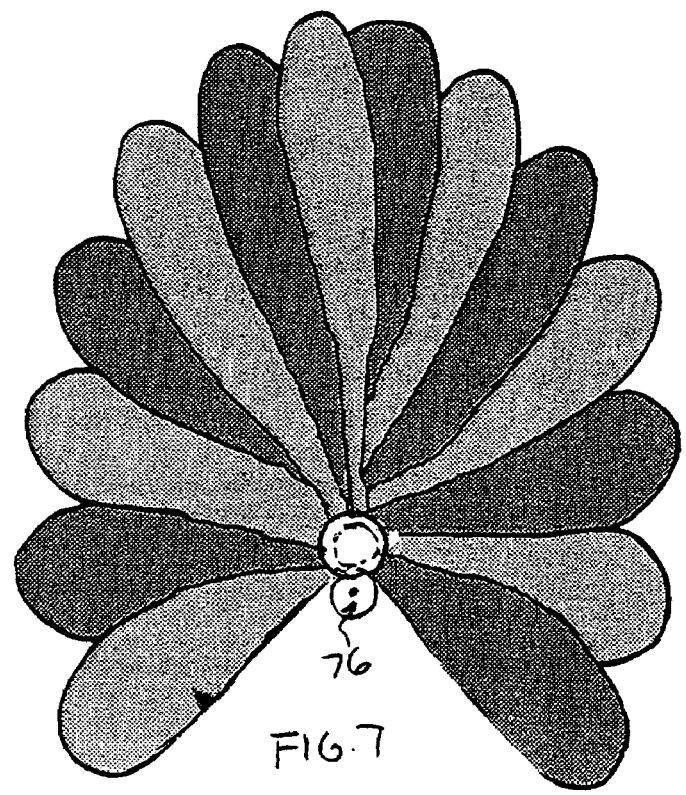
FIG. 7 shows a break away view of the back feathers of the timer in FIG. 1 in a normal position.
Figure 8:
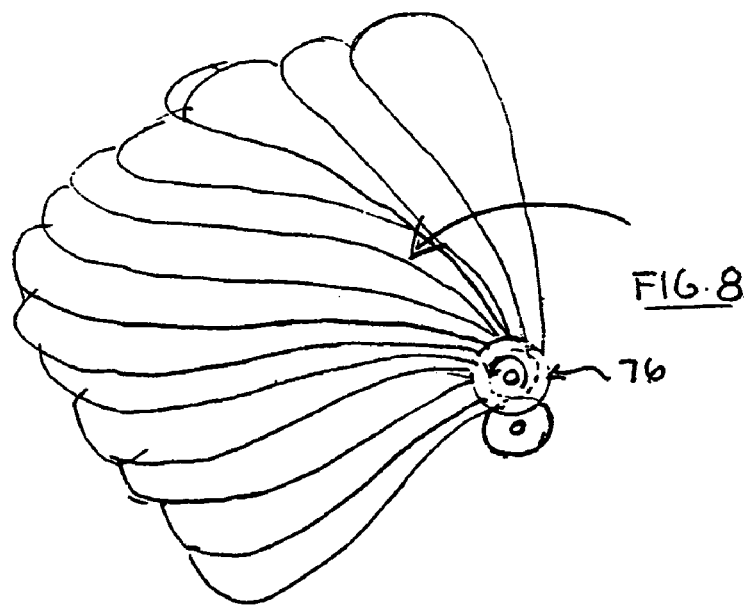
FIG. 8 shows the feathers of FIG. 7 in an adjusted state.

If mechanical driver 72 is opted for, suitable gearing and the like is preferably added to move a component of the representative configuration. FIGS. 7 and 8 illustrate one possible embodiment wherein a small electronic motor or the like is provided (e.g., in the base or some other location) together with a shaft and gearing as generally represented by transmission 76 in FIGS. 7 and 8 which is driven by said motor. Transmission 76 is in driving arrangement with the plumage feathers 40 which are in a staggered nestable (oriental fan like) arrangement on a common shaft whereupon they can be moved upon transmission activation (e.g. all to one side as shown or, for example, opposite sides compressing toward the middle and back which maintains a symmetric distribution of weight). The idea being to provide a movement associated with the representation of the configuration (e.g. the turkey shown in the present drawings). Another example of a movement associated with the representation would be beak movement. FIG. 7 shows the normal state, while FIG. 8 illustrates an end point of a range of motion (preferably repeating between the end point and the normal position in one or multiple directions) of one possible movement sequence wherein the plumage feathers' position are adjusted.

In similar fashion, light system 74 can be used as a signal generator either alone or in conjunction with another signal type. The lighting arrangement is preferably a high awareness signal such as a lighting of plumage feathers formed of translucent or transparent material or an altering of colors of the same. The light source shown can also be used as a general lighting source such as relative to the dials and indicia or to provide the cooking facilitator with the additional function of a light source to facilitate low light level cooking environments (e.g., a light bulb provided behind a transparent dial and/or display platform on a larger sized facilitator for example or with a flashlight arrangement for hand held sizes).

The rear view of FIG. 3 also illustrates information display 78 with information indicia 80 (such as recipes or cooking steps—the latter being illustrated in FIG. 3). Indicia 80 can be fixed print or the like or can be a more sophisticated information display means such as a scrollable screen with LCD backdrop, for example.

Figure 6:
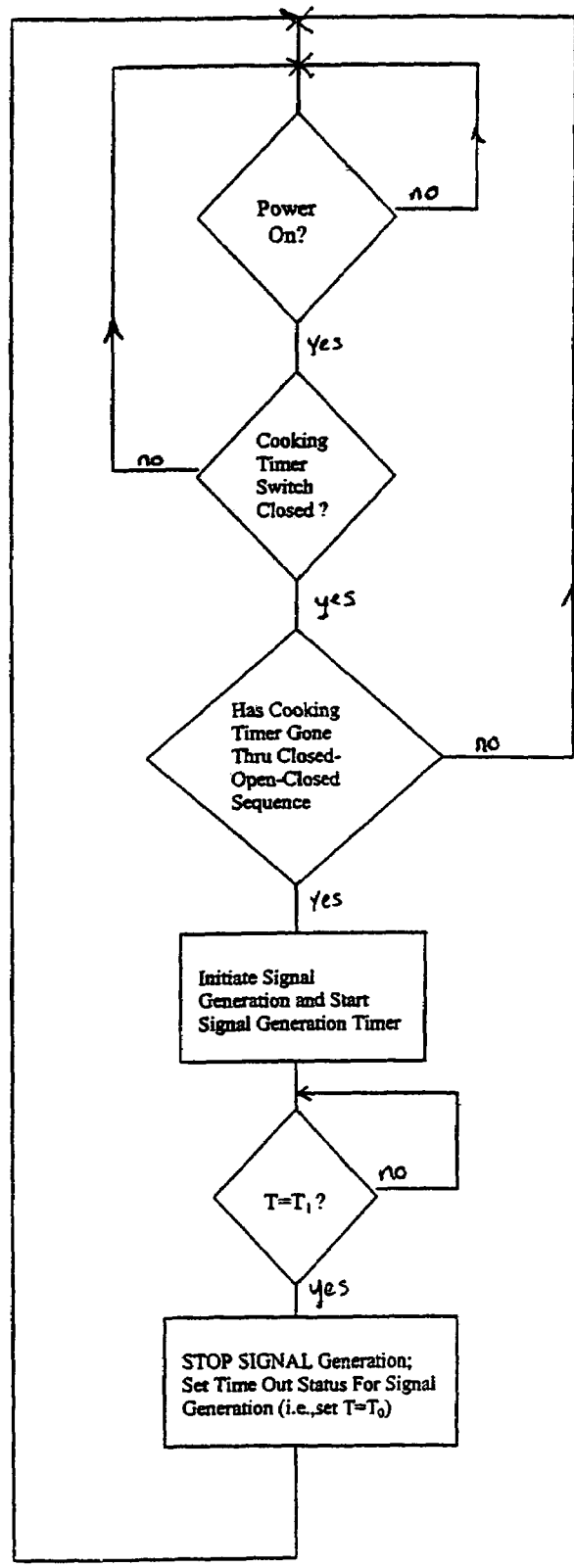
FIG. 6 shows a flow chart of one possible logic sequence for use by the signal generation system.

FIG. 6 illustrates an example of a logic sequence for the system shown in FIG. 5, where a contact dial or the like is utilized for trigger means 70. As shown in FIG. 6 with the power on, a review is made as to whether the timer switch is in a closed contact or triggering setting. If yes, a check is made as to whether a logic sequence has been involved (e.g. going from a contact to no-contact to contact position as would be common for a dial setting mode from a prior arrangement). A variety of other arrangements are also possible under the present invention such as a separate on/off switch for the power source and a triggering arrangement that is activated any time a dial contact range point is set and/or a separate signal generation button to allow for the sound to be activated independent of the countdown based triggering means. An alternate arrangement can include a sensor for sensing whether the timer has undergone a period of countdown since the last triggering of the signal generator.

FIG. 6 further illustrates that, if the on-off-on logic sequence has taken place since the last reset of the triggering means, the signal generator is activated to carry out one or more of various signal generations. This signal generation can be continuous until the user turns off the signal generator. Alternatively as shown in FIG. 6, the signal generator can be set to run for a preset period and shut off after that period has expired whereupon a reset mode is activated. In an alternate embodiment, the signal can be made to run for one or more intermediate periods between periodic shut offs relative to an overall reset/full shut down period. The sound level, if a sound generator is involved, can also be changed (e.g. increased over time) and/or the sound generated (switching from an earlier gobble sound to a whistle and/or voice command such a warning—e.g. "Stop cooking as I'm drying up").

Figure 12A:
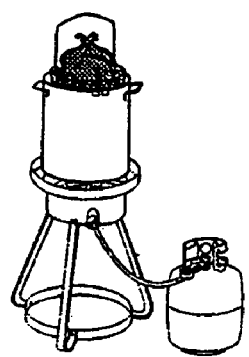
FIGS. 12A-12C show a turkey frying system and the steps of initial insertion of a turkey in an outdoor deep fryer.
Figure 12B:
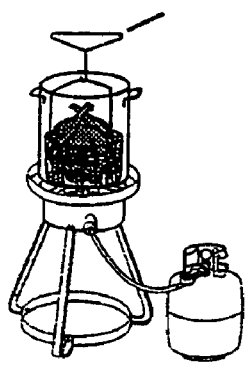
Figure 12C:
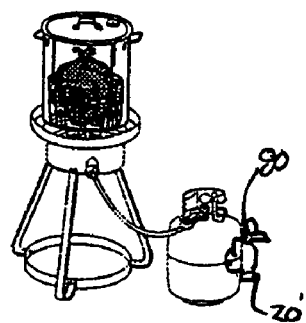

FIGS. 12A to 12C show a general insertion sequence for a turkey being placed in an outdoor cooking pot, which is described in greater detail in the aforementioned U.S. Ser. No. 10/005,311 filed Dec. 7, 2001. FIG. 12C also illustrates an alternate embodiment of the present invention which includes attachment means 80 for attachment of the food cooking facilitator 20'. As one example of the wide variety of attachment means contemplated for use with the present invention, FIG. 12C shows an attachment means suited for attachment to a gas tank (e.g. a suction cup(s) arrangement which can be attached to a side of a propane tank or a releasable or more permanent adhesive relationship) or loop or alternate fastener either for attachment to the tank body or valve protection ring, for example, or a soft loop, spring clip like fastener or the like for attachment to the gas line at a location preferably close to the tank end. In the latter case the weight and size of the cooking facilitator would be minimized so as not to strain the gas line tube/fixtures attachments.

As an example of a cooking sequence associated with that illustrated in FIGS. 12A-12C, the following process is set forth:

Provide a turkey (e.g., a whole bird, preferably 16 lbs maximum with a range of 5 to 20 and a sub-range of 8 to 16 being illustrative)

The amount of oil needed in the cooking pot is determined by the size of the turkey (note the present invention's food characteristic setting means can also provide a general guidance scale as to the amount of oil typically needed with a particular bird to help facilitate providing the appropriate amount of cooking oil to the pot—which can include a liquid volume scale such as a quart or liter scale linked to the weight scale and preferably to a particular type of cooking pot (although a plurality of different dimensioned cooking pot parameter levels can be displayed with the facilitator)). To determine the appropriate amount of oil, the turkey, wild or domestic, is placed into a cooking pot preferably after placement into a fryer basket or onto a turkey support. Following placement of the bird into the pot, the pot is filled with water until the butt of the bird is covered. Then the bird is suspended from the pot, allowing all water to drain from the bird back into the pot. Once this is complete the level of the water is marked. The water is then emptied from pot and the pot refilled with oil to the marked line. Three inches of space should be provided from the top of the pot to the top of bird. Prior to cooking, the bird should be thawed out and free of any excess water and any plastic pop-up thermometer. Prior to insertion into the cooking oil the turkey is preferably covered with, for example, Cajun spices both outside and on the inside cavity. The oil temperature is then brought to 350° F. by adjusting the burner flame and monitoring a cooking thermometer inserted into the oil (e.g. a thermometer clipped to the top edge of the pot). The cook keeps a close watch on the temperature as it is important to maintain as close to 350° F. as possible while cooking. The turkey is then placed in the basket or on the rack with the legs of bird pointing up. The cook then slowly lowers the bird into the 350° F. grease or oil (wearing a cooking glove for splatter protection).

Within a range of before or shortly after (e.g. within 3 minutes) inserting the turkey into the pre-heated cooking oil, the cook sets the cooking facilitator of the present invention by inputting the characteristic relied upon (weight in this instance) to set the cooking time. The count down is then initiated and when the set cooking time is complete the signal generator is activated to inform the cooker the cooking period is complete in accordance with the preset value. The present invention precludes the cook having to consider the question of "when did I start cooking" which can be difficult to remember particularly for long cooking periods and is very common in outdoor cooking settings where a timer might not be readily viewable or available. Once the timer goes off (a time down or manual shut off), the cooker is turned OFF and the bird removed slowly with the grab hook, allowing the oil to escape the bird inside and out.

In addition, to facilitating matching a proper cooking time with weight of the bird (or other food characteristic), the cooking facilitator helps in planning the cooking process ahead of time and, as noted above, can also help provide guidance as to other cooking characteristics such as how much oil should be purchased to ensure coverage of the turkey chosen following the water marking test.

Provided below is one example of the manner in which the cooking facilitator of the present invention can provide the cooking time relative to a specific weight through use of, for example, a suitable formula for the cooking process intended. As noted above, a fixed time scale can be associated with a fixed weight scale with a preferred embodiment featuring circumferentially arranged scales with a turn dial with radial pointer for helping to show the appropriate (e.g., formula based) cooking time by visualization, along a common radial line, the tick marks for the respective scales. Other arrangements are also covered under the invention such as a lever with linear scales, etc. If the above noted formula of (W×3 min.)+5 min equals total cooking time is utilized then, then the scale would inform the cooker that an 11.5 lb turkey would have a cooking time of 39.5 minutes which would be set by the cooker simply by adjustment of a dial, lever or other countdown positioning means to the weight value of the bird.

Example: Cooking a 11.5 pound turkey 3 minutes per pound plus 5 minutes, for a total cooking time of 39.5 minutes. (11.5 Pounds×3 Minutes=34.5+5 Minutes=39.5 minutes). When the cooking facilitator signals the turkey is done, the burner is turned off and the turkey removed from the basket (preferably after a period where it is lifted out of the oil above the top of the oil in the pot to allow for the dripping off of the cooking oil such as through use of the capture hook arrangement described in the aforementioned U.S. Ser. No. 10/005,311). The turkey is then removed from the cooking pot after sufficient drainage and then allowed to cool for eating. Note: If the turkey should float before the cooking time is complete, this does not mean the turkey is done. Thus, the cooking facilitator helps avoid a premature removal by ensuring conformance with the time parameters established above. For pheasant, Cornish hen, chicken, and quail, the same time formula can be relied upon (e.g. a highly universal one such as described above) or a different formula for the particular type of food product can be set either with a multi-product cooking facilitator (e.g., one with multiple scales) or with reliance on a specially designed cooking facilitator with only a single scale and with a configuration suggesting the type of food item that particular cooking facilitator is best suited.

Under the process of the present invention it is possible to deep fry more than one bird at a time, but it is generally recommended that in calculating the total cooking time using the facilitator of the present invention, the cook should not total the weight of more than one bird. For example: For three Cornish hens at 2 lbs. the facilitator should be set based on 2 lbs and not the sum of 3 birds (a scale value such as one based on the above formula where the cooking time information would be 6 minutes ((2 lbs weight times 3 minutes) plus 5 minutes for a total cooking time of 11 minutes).

As a further example of some alternate indicia/information that can be provided by a facilitator of the present invention, the invention features a scale for cooking one or more turkey breasts (an example of different cuts of the food item type) as opposed to a whole turkey. In this situation the cook would follow the directions for a whole bird, but with a different cooking period involved determined by the cooking facilitator of the present invention. For example, a breast formula for use in establishing a cook time/weight interrelationship for the cooking facilitator can be based on a formula of cooking for 7 minutes per pound of breast meat plus 5 minutes to get a total cook time. (3 pounds of turkey breast×7 minutes per pound=21 minutes+5 additional minutes=26 minutes total cook time). Thus an additional scale can be provided under the present invention either alone or in conjunction with a whole fryer scale.

Figure 9:
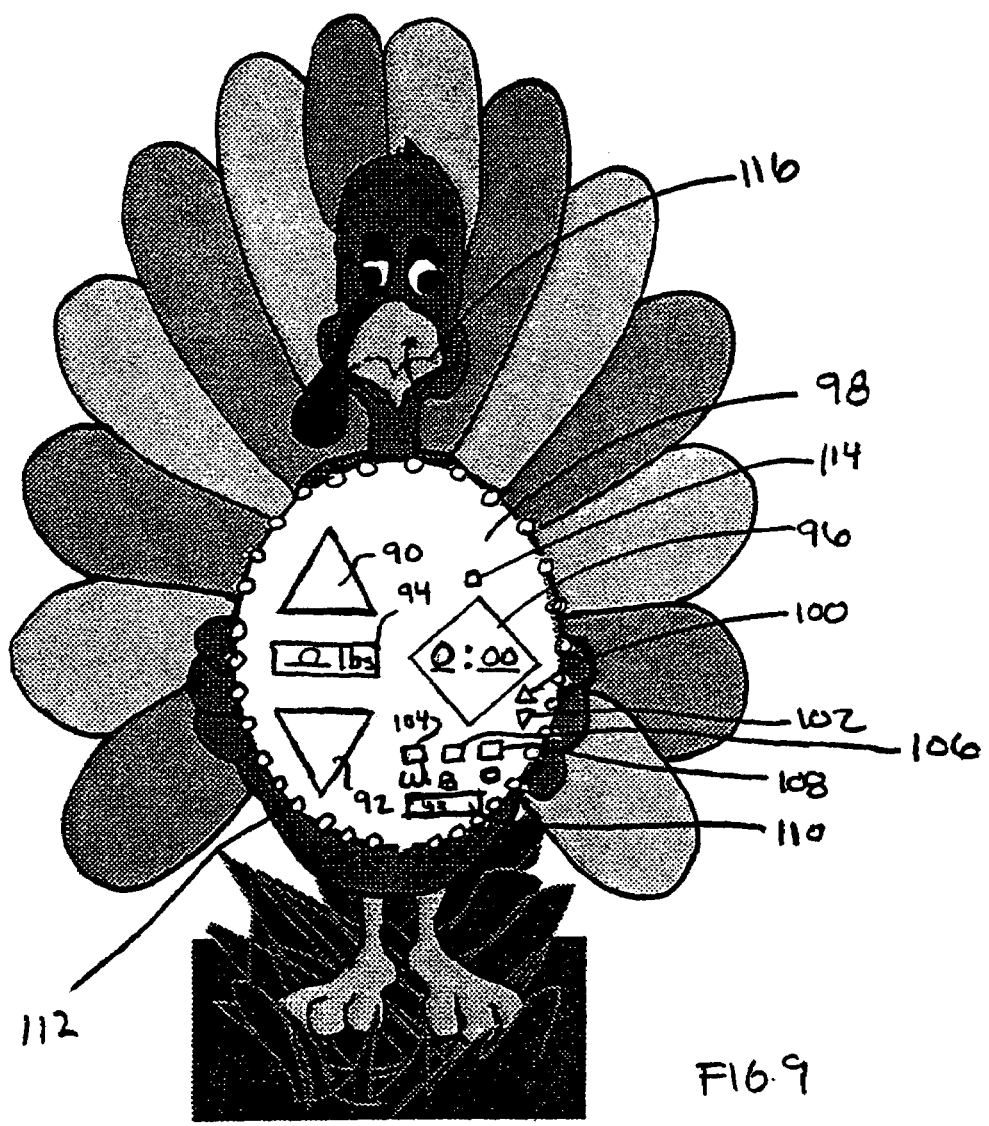
FIG. 9 shows a front elevational view of an alternate, second embodiment of the present invention.
Figure 10:
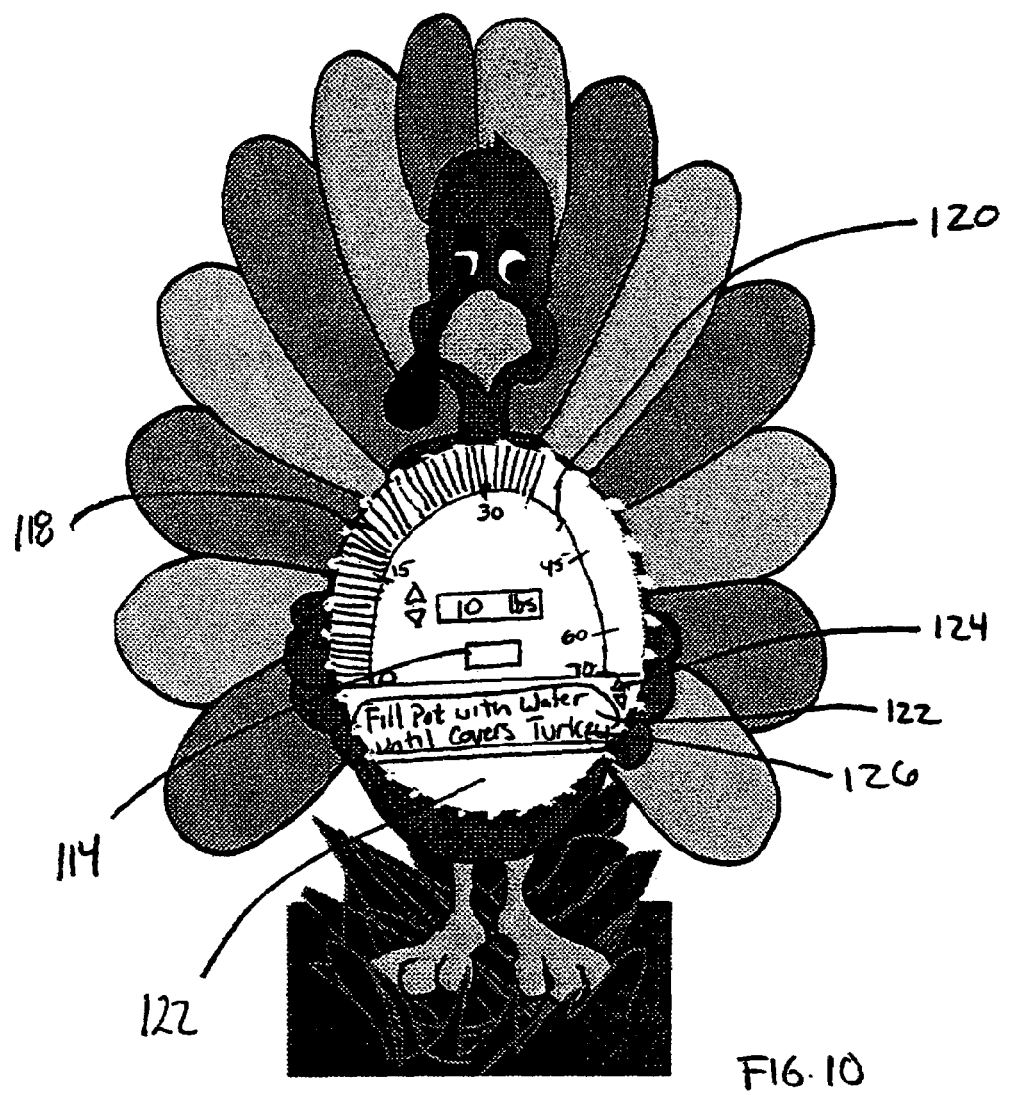
FIG. 10 shows a front elevational view of an alternate, third embodiment of the present invention.
Figure 11:
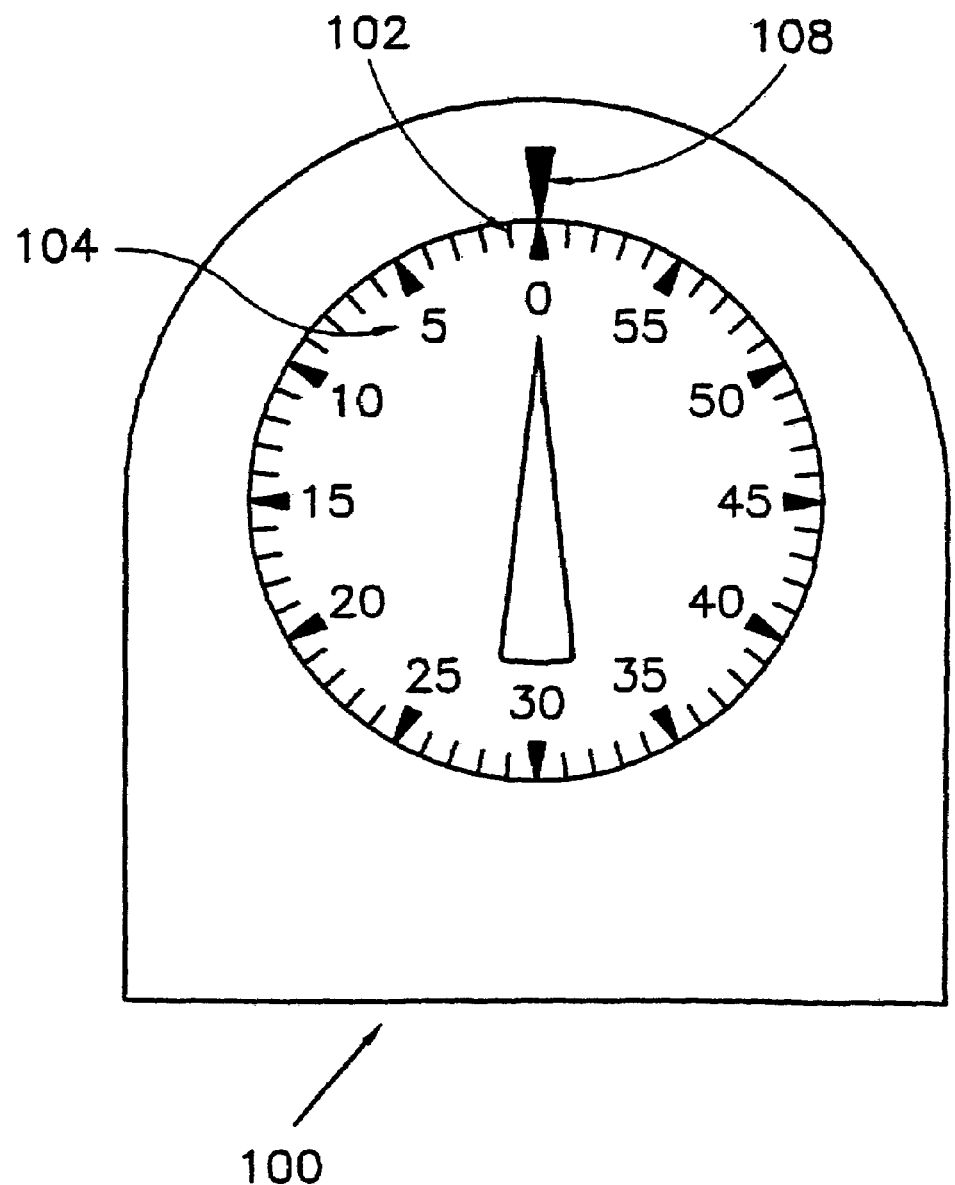
FIG. 11 shows a prior art countdown timer.

FIGS. 9 and 10 illustrate alternate embodiments of the invention featuring non-mechanical countdown timers which utilize timer and control circuitry coupled with visual displays and button adjustment means. As shown in FIG. 9, for example, the means for inputting a food characteristic is represented by adjustment means such as the up and down button arrows 90 and 92, which share functional similarities with the aforementioned mechanical dial, and the weight display 94 (e.g. an LCD display panel) which can be set at 0.1 or 0.5 pound intervals for enabling an operator to insert the weight of the food product (e.g., whole turkey or turkey breast) by manipulating buttons 90 and 92 until the appropriate weight is reached. The display platform 98 of the cooking facilitator's configuration shown in FIG. 9, further includes a time display 96 which is linked with the food characteristic input means to reveal the cooking time associated with the food characteristic input displayed in display 94. Through use of appropriate logic circuitry (not shown in FIG. 9) such as one based on the aforementioned formula (W×y min)+z min=T (with W representing weight, y representing a desired min multiplier and z representing an added time variable, and T representing the total countdown cooking time), the total cooking time can be displayed in display 96 (e.g., adjusting simultaneously up and down with cooking characteristic variation, or after a preset time delay following a period of no button manipulation or a display trigger button).

FIG. 9 illustrates some additional time adjustment means such as the override up and down buttons 100 and 102 which allow an operator to alter the time in 96 either following the illustration of a formula based time entry or exclusive of such an operation. FIG. 9 also illustrates food characteristic adjustment means such as option buttons 104, 106 and 108 which allow an operator to toggle between different formulas such as a pre-established formula like that described above with W in the formula being set by the operator and y equal to 3 minutes and z equal to 5 minutes. In FIG. 9, button 104 is noted as "W" which is representative of a "whole fryer" mode (for which the above formula based logic is suitable), while button 106 is noted by "B" which is representative of a "breast fryer" mode having a different, but pre-established different formula stored in the memory of the processor associated with the logic circuitry (e.g. the same formula above but with y=7 minutes instead of 3 minutes.) Button 108 is noted by "O" for other which is representative of the ability to raise or lower variables in a specific base formula such as varying y and z manually through use of up and down buttons such as buttons 90 and 92 following a logic recognition of a switching into the "other" mode. The logic control can also present the variable in sequence for adjustment (e.g. repeated pressing of "O" button) with display 110 for showing the variable and adjustment (or through reliance on one of the other above described displays following a logic switch over). Additionally (or instead of), the other button can provide access to enable a cook to insert an entirely different formula similar to formula generation on a calculator that allow for formula generation.

FIG. 9 also illustrates countdown trigger button 114 which when pressed leads to a countdown process which countdown is displayed in display 96 by a reduction in the time amount illustrated. FIG. 9 further illustrates a set of lights 112 (e.g., LED's) arranged around display platform which are triggered by the light signal generator means 74 to initiate a light display (e.g., flashing or a traveling series of lights around the ring) when the countdown timer and display reveal 0 time. Further illustrated in FIG. 9 is moving beak 116 which is also tied into the logic circuitry (e.g. mechanical transmission signal means 72) for activation when the no time left point is reached on the countdown time means.

FIG. 10 illustrates an alternate embodiment of the present invention which is similar to that described above in many respects (e.g. a weight display with up and down adjustment buttons and countdown trigger 114), but features an alternate type of countdown time display 118 which is more visible (easier to be viewed at a longer range) in its presentation of a generally moving "solid" visual depiction of the time remaining display which wraps around a time scale 120 on display platform 122 and moves (counterclockwise in this case) as the cooking time remaining counts down. Further in FIG. 10 there is illustrated an additional display screen 122 which displays information indicia such as the cooking steps (one step shown in screen) and scroll buttons 124 which allows an operator to move through the indicia information such as the various cooking steps outlined above.

FIGS. 13-15 illustrate an alternate cooking system 130 like that described in Ser. No. 60/302,357 filed on Jul. 3, 2001 featuring a deep fry rack 132 and U.S. Ser. No. 10/187,440 filed Jul. 2, 2002, particularly well suited for deep frying multiple steaks and other objects smaller than a whole turkey (e.g. a plurality of smaller poultry such as Cornish hens or pork chops), which provisional application is incorporated herein by reference in its entirety. As shown in FIG. 13, as in the other embodiment there is provided an outdoor cooking burner, cooking pot and grab hook and bailing basket.

As shown in FIGS. 13 and 14 rack 132 includes prongs (e.g. 4 prongs) designed to pierce one of the multiple cooking items (e.g., Cornish hens CH or steaks S or chops (not shown) to be deep fried or otherwise cooked in the cooking pot). FIGS. 14C and 14D show a stacking arrangement wherein a first pair of steaks are pierced and then another pair of steaks supported by a top circular rack ring without prongs is asserted over the lower rack ring's prongs for engagement (and suitable retention to maintain the cooking items in position during the cooking process).

FIG. 13A further illustrates cooking facilitator 134 (shown mounted on a propane tank as described above for the earlier embodiment although it can also include a base for stand alone support on an underlying surface such as a picnic table). Also, cooking facilitator is designed for use with rack 132 which is often used for cooking steaks. Thus, cooking facilitator 134 preferably has a configuration associated with this cooking type such as the head of an Angus cow or the like with a display platform for conveyance of the above noted information. If the cooker has deep frying pork chops as a preference the facilitator can have a pig associated representation. A suitable sound generation ("mooo" or "oink" for example) is also preferably utilized in similar fashion to the above described embodiments.

As an alternate embodiment, FIG. 13A illustrates a box type (no-representation of any particular type of food source) with its attachment means being designed for attachment to the gas line such as a close to closed U-shape attachment member which can be sprung open to increase the size of the opening slot and released for forming a sufficiently annular enclosure arrangement relative to the gas line.

Also, as a characteristic for steak which is highly determinative of its cooking time in a deep fry, for example, the cooking facilitator 134, for example, includes means for inputting (e.g. dial or lever movement or an electronic circuitry input button or the like) the food characteristic (thickness in half or quarter inches for example with a suitable range for anticipated thicknesses) and there is also preferably provided the means for conveying the countdown time associated with the input characteristic such as a fixed or movable time scale as in FIG. 1 or electronic display as in FIGS. 9 and 10. The means for interrelating the two include, for example, the association of scales or a formula and/or stored memory (e.g. a library of time versus food characteristic values) technique for providing the cooking time value for the characteristic provided as described above for the earlier embodiments.

FIG. 15 illustrates a suitable memory library between thickness and time which can also represent associated scale points. FIG. 15 further illustrates an additional cooking characteristic which can further facilitate the cooking process. FIG. 15 adds the additional categories of the level of degree of cooking (a few of the typical levels being noted "Medium Rare"; "Medium", Well Done" although additional range points can be involved such as "Medium-Well"). This additional characteristic can either be set (e.g. a toggling of the time display by pressing different cooking degree levels once the thickness is set or the presetting of the same prior to display of time or the presentation of all time levels for the different cooking degrees). For a fixed display example, a plurality of circumferentially arranged time scales are provided preferably with different color codes to help distinguish the cooking level degree—such as red—red/brown—brown color coding for the corresponding cooking degree.

Figure 16:
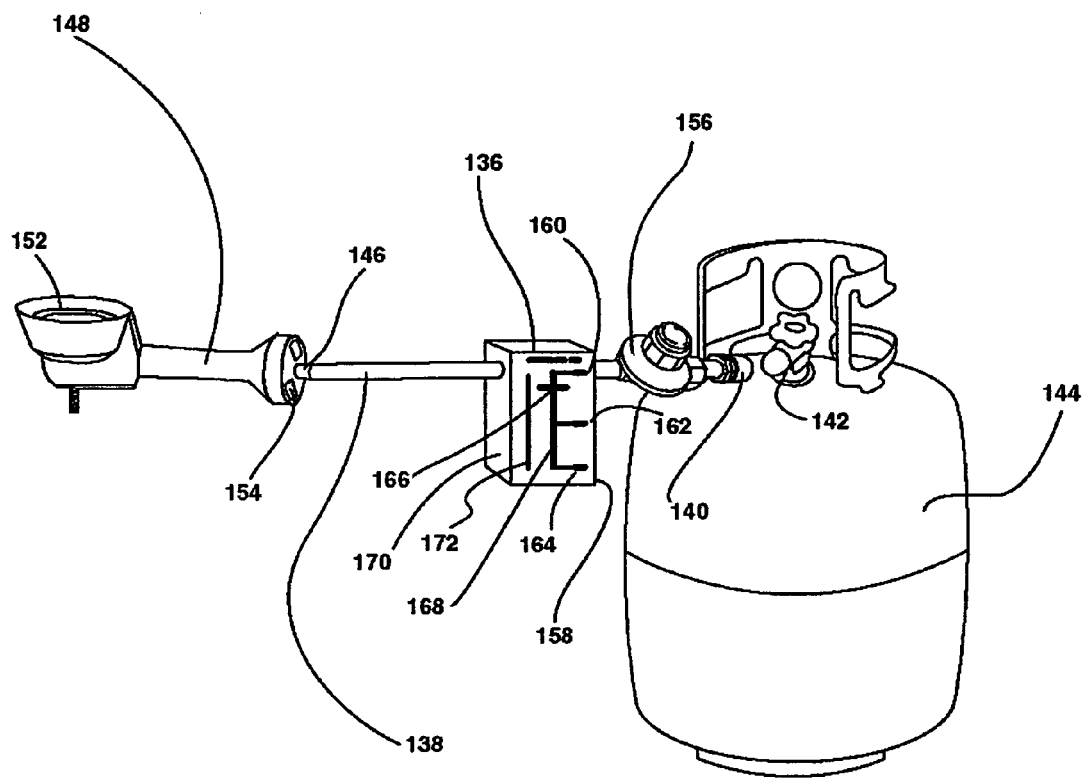
FIG. 16 shows and outdoor cooker burner assembly with a gas flow timer.

FIG. 16 of the present application illustrates an alternate timer embodiment of the present invention which can be used either in conjunction with the cooking timer or independently. The timer 136 in FIG. 16 is a gas flow timer which is used to help ensure that a user of an outdoor turkey fryer or the like does not leave the cooking area unattended for an extended period. That is, if a cooking area is left unattended for too long with the burner running and cooking oil in the pot there is a chance the cooking oil will reach its flash point and ignite, particularly when dealing with low volume oil amounts which heat up faster. There is also the possibility of some other accident occurring while the area is left unattended (e.g., burner knock over and spillage). There are a variety of variable which influence how rapidly cooking oil will increase in temperature such as the cooking oil type, the volume of that oil, the characteristics of the cooking vessel (bottom area presented to the burner flame and the side configuration and height) and the level and efficiency of the burner (including environmental factors such as outdoor temperature and wind conditions). In view of this it is difficult to determine the actual oil temperature for any given situation absent a direct temperature measurement of the oil. As outdoor cooking burner assemblies are often subjected to extended periods in harsh environments (e.g., stored in the back of a pick up truck), highly sensitive sensing electronics, etc. are generally not practical for environments such as noted above. Thus, in a preferred embodiment the timer is a mechanical timer (e.g., spring loaded with count down and no electronics as in standard wind up egg timers) free of electronics, although the present invention further includes alternate timer power sources such as a battery powered timer.

Timer 136 in FIG. 16 is shown in line along the flexible gas conduit 138 extending between the burner 148 and the tank end connector 140 (which in the illustrated embodiment is designed for threaded engagement into the female thread reception port 142 of fuel source 144 (e.g., the invention is well suited for use with propane or natural gas fuel sources). Fuel source 144 in FIG. 16 is a propane gas cylinder or tank). The opposite end 146 of conduit 138 is releasably or fixedly connected with burner 148 having flame outlet 152. Burner 148 is designed for attachment with an outdoor cooker stand such as stand 150 shown in FIG. 18 and is shown to have air entrance conduits 154 which are adjustable to adjust the level of air intake. There is further provided in line between the fuel source and flame outlet, a gas flow regulator 156 which can be adjusted by hand turning to either full fuel (propane gas) output to the gas burner or some other lower setting including a shut off state. Timer 136 is shown in a preferred position at an intermediate to closer to the tank position and between the regulator and the burner, although a variety of alternate designs/positions are also featured under the present invention such as positioning the gas flow shut off with timer means between the regulator and connector 140.

As shown in FIG. 16, timer 136 has time indicia 158 wich includes an "off" setting 160 and a maximum setting 164 which provides for time range options between no time or shut off state to a maximum time amount. The maximum amount of time is determined by the manufacturer to provide the safety function while keeping in mind the need not to interfere to too great an extent with a proper cooking procedure. The time range can also vary based on intended use such as a longer period for a turkey fryer system wherein 3 gallons or so of cooking oil needs to be heated up to 350 degrees F. or so which takes longer than, for example, a smaller food item fryer such as an outdoor french fries fryer. Also, while an advantageous feature of the present invention is to provide a means to avoid leaving an outdoor cooking oil assembly unattended as noted above a variety of other potential accidents can occur (e.g. knock over). Thus, even with a steamer set-up (water as cooking medium) and other non-oil setups, the timer can be helpful relative to maintaining the cooking system attended. That is, the gas flow timer system of the present invention is not limited to cooking oil utilization, but helps promote the "keep attended" safety facet of the present invention for a variety of cooking settings. A preferred temperature range which is generally universal for a multitude of outdoor cooking uses is a 30 second timer period with preferably at least one additional intermediate time indication 162 to help the user gauge generally what time is being set. Alternatively a more finely detailed scale is provided (e.g., down to minutes and/or 5 minute blocks), but unlike the cooking time where a specific time amount is often desired, the "keep attended" period does not generally in need of high precision. As noted, however, shorter or longer ranges (e.g. 15 minutes or 45 minutes) may be utilized, but a 15 or 30 minute range is well suited for avoiding overheating while not unduly interfering with an ongoing proper cooking process.

FIG. 16 further illustrates timer setting means 166 which is in the form of a handle received in slot 168 that corresponds with the time range provided, although other embodiments such as a rotation dial with corresponding circumferential time range are featured under the present invention. Thus the cook can quickly set the time range desired relative to the keep attended period. Slot 168 is formed in housing 170 within which is positioned the valve assembly for shutting down the gas flow upon the time counting down. Upon timer counting down to the end of the time period set (e.g., reaching the off setting) the timer controlled valve closure means operates to close off the valve until the operator resets the timer to reinitiate a flow state such as if there is still needed greater time to continue cooking. As with the cooking facilitator described above, in an alternate embodiment of the invention there is further provided signal means such as the audio signal (mechanical generated signal such as a bell or battery operated audible— "Gas Flow Stopped"). There is also preferably provided on timer housing 170 further indicia as to time range increase direction 172.

A variety of valve and valve closure means are featured in the present invention such as ball valves, cylinder valves, butterfly valves, plunger and diaphragm valve structures. The valve utilized is contained and protected by housing 170 and is preferably one that placed in a closure state by mechanical means interrelated with the setting means (e.g., dial or handle), although the present invention also features both electrical timers and electrical or electrical mechanical combinations (e.g., electronic clock signals when time period expires leading to a triggering of a solenoid valve closure means as an example of an electrical based system deriving power, for example, from a battery). A mechanical means, however, is preferred for the setting, count down and valve closure means of the present invention both in view of the potential harsh environment and avoiding having to rely on the owner to change batteries for functioning of the timer. Although the present invention also features a fail close biased valve such as a spring biased solenoid valve wherein the solenoid moves open against the spring biasing closure when the setting means is away from off position but shuts off the valve when the setting means reaches the off setting or when there is a lack of power in the system due to, for example, lack of sufficient battery power. FIG. 19A illustrates schematically a sliding device which can be used in association with the setting handle means to lift off the valve plunger when the timer is moved from the off position but allows a spring biased plunger to close when the setting means and the associated sliding bar with off positioning opening reach the off position wherein the biased plunger is activated.

Figure 17:
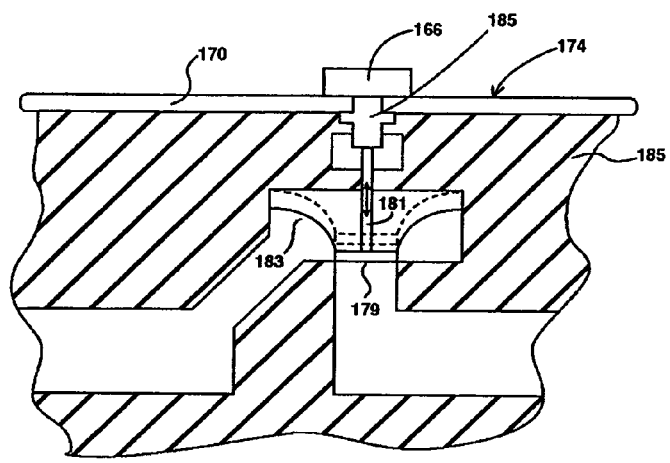
FIG. 17 shows a schematic view of a gas flow stop (or reduction) valve.

FIG. 17 illustrates another embodiment of the invention featuring a mechanically activated gas line close off valve with a closure disk 179 attached to an adjustable rod 181 and diaphragm 183 which disk is in a closed off seal state when the higher height portion 178 of cam 176 reaches the off position. Cam 176 is attached to setting handle 166 and has retention wings 180 which are wider than the slot formed in housing 170 to prevent release when portion 178 bears down on the rod to place it in a valve sealed off state which is held in place by spring bias until the operator pushes back the setting handle against the bias (which also preferably is a component of the standard mechanical count down mechanism). The diaphragm arrangement provides for automatic opening due to the gas line pressure (e.g. 5 psig in a preferred embodiment although higher settings such as 5 to 20 psig is also a feature of the present invention, but the lower setting level is preferred as higher settings increase the potential for reaching undesirable temperature levels greater than either of 400 or 450 or 500° F., within too short a period. Rod 181 can also be biased open with a suitable spring (not shown) provided around the rod and pushing on an extension of the same and a contact surface provided by the valve casing 185.

Figure 17A:
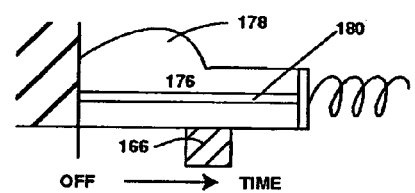
FIG. 17A shows an example of a close off valve cam.
Figure 17B:
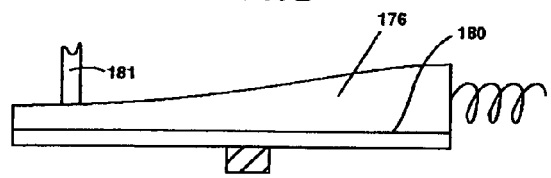
FIG. 17B shows an example of a gas flow reduction lever.

FIG. 17B illustrates an alternate embodiment which is similar to that in FIG. 17A but for cam 176' having a sloped rod contact surface such that the gas flow is first reduced gradually during, for example, the last 25% of the time set until the final closure point is reached relative to the highest end of the cam.

FIG. 18 shows an alternate embodiment of a valve closure/opener activator featuring cylindrical valve body 182 which is connected with the time setting means (dial 184) such that as the dial goes through its time countdown gas is free to flow via the annular recess 186 which is in communication with upstream and downstream gas flow openings provided in the valve casing (not shown) which are blocked off when solid portion 188 moves into position over one of the gas flow openings to block the same which is coincident with the off setting of the countdown timer.

Figure 19:
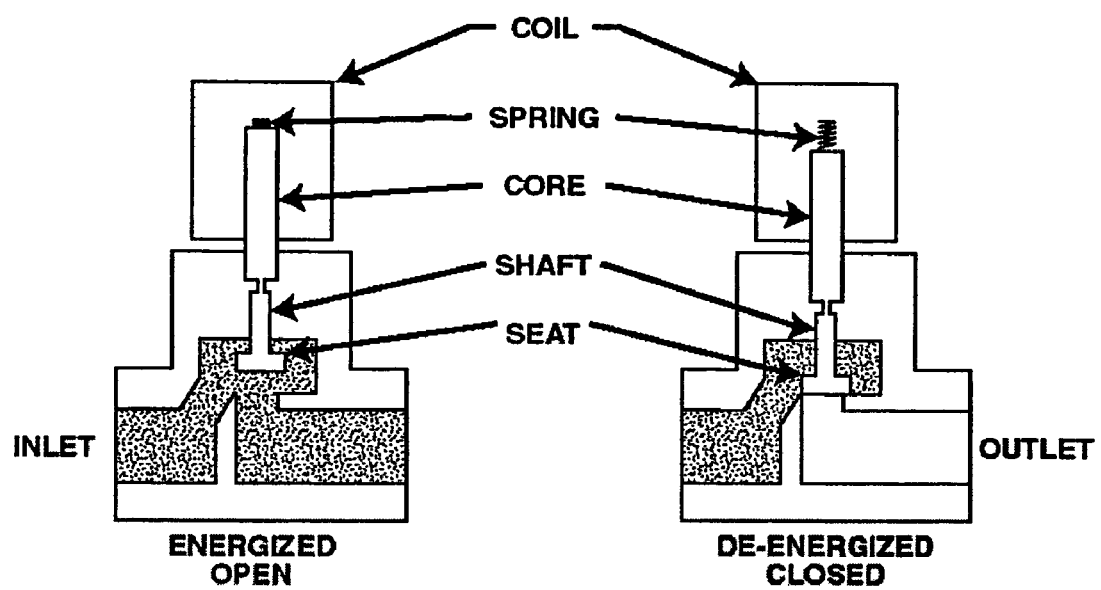
FIG. 19 shows a solenoid based valve.
Figure 19A:
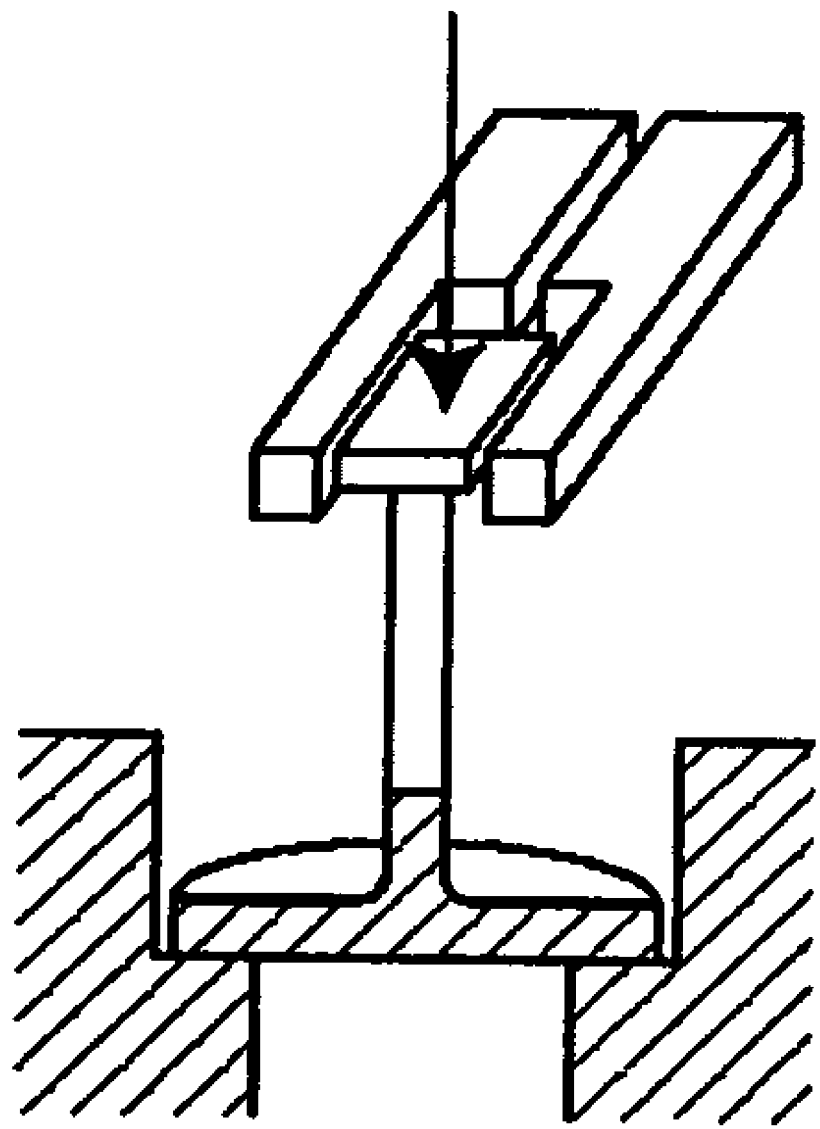
FIG. 19A shows a schematic view of a mechanical valve position adjuster.

FIG. 19 shows an example (closed an open states) of an electronically controlled valve 190 which is battery operated to trigger shut down when the timer moves to count down complete status (e.g. signals a power up and move valve off closure position when timer moved or set away from the off state) and power down and into a closure state via spring bias to close off valve when either the timer reaches off or when there is insufficient batter power (requiring operator replacement to enable functioning).

Solenoid generally comprise of a wire coil and a movable plunger that seats against the coil. When current is applied to the coil, an actuating magnetic field is created. Solenoid valves are electro-mechanical devices that use a solenoid to control valve actuation. Electrical current is supplied to the solenoid coil, and the resulting magnetic field acts upon the plunger, whose resulting motion actuates the valve. Standard models are available in both AC and DC voltages and can be battery operated. Another characteristic of solenoid valves is whether their normal operating state is open, or closed, when not energized. FIG. 19 illustrates a standard set up for a solenoid valve which is pulled open when the energy is applied (e.g. a sliding electrical contact that is open when the setting means moves off the off position but which de-energizes when the setting means reaches the off position in which case the solenoid is de-energized and the spring forces the plunger into a stop position). A similar arrangement can be made mechanically as described above for FIG. 19A. For example, rather than an electrical solenoid, the plunger can be held up by a sliding bar (associated with a setting means) and then when the setting means reaches the off position an opening in the sliding bar is presented in which case the spring biased plunger is freed to move into a valve close position.

Figure 20:
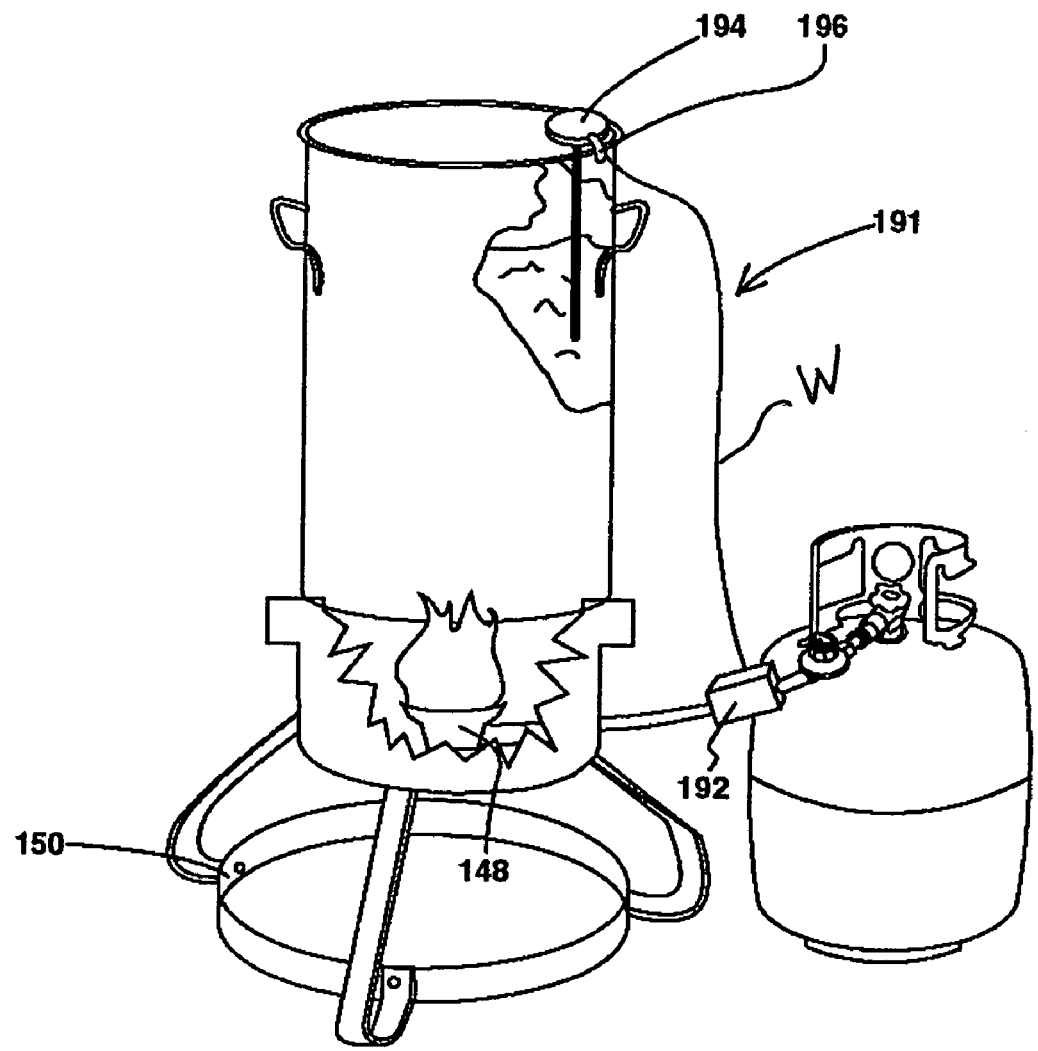
FIG. 20 shows an outdoor cooking assembly with gas flow timer and added temperature sensing means.

FIG. 20 shows an alternate embodiment of the invention featuring a gas flow shut off valve like that described above with an added temperature based gas flow shut off system 191. As described above, due to the potential for harsh handling and harsh environmental situations, complicated electronics and sensors is preferably not used. FIG. 20 illustrates a system with a temperature based shut down system that is efficient in structural component usage and avoids complicated sensor devices. FIG. 20 features a modified gas flow timer 192 which has a supplemental (or complete replacement if a temperature only based system is desired) valve shut down triggering means. System 191 features a temperature sensor 194 which is preferably a temperature thermometer (cooking thermometer suited for cooking temperatures involved such as 0 to 500 degrees F. shown, for example, on a display cylinder with temperature point settings and a moving (mechanical) dial). Other sensors can also be used such as a single point trigger sensor (temperature induced strain gauge for a metal support) rather than one that also functions to illustrate the cooking oil or fluid temperature. The thermometer has a sensing probe of a length designed to extend into contact with the cooking fluid from the top edge of the cooking pot where the thermometer is shown as being clipped via clip 196. Sensor wire extends down from the temperature sensor into communication with the valve of the timer 192. Thus when a predetermined temperature limit is reached such as 450° F. the sensor triggers a signal to the valve to initiate a shut down. For example, a switch point can be triggered mechancially when the thermometer dial reaches the preset upper level temperature (e.g., 450° F.) and the battery operated solenoid in the gas shut off valve is triggered into a closure state even when the countdown timer is still counting down time or not being used. Alternatively, from the standpoint of avoiding an energy drain and reserving battery power for operation of the temperature sensor components of the dual gas timer and temperature monitoring valve of the present invention, a mechanical valve closure associated with the timer and an electronic activated mechanical of movement device is associated with the temperature sensor (e.g. a biased member which is released by way or movement of a blocking or stop member when the temperature is sensed so as to release the biased member and either move the timer based valve stop into stop position or move a second, independent valve stop into a flow stop position. For example, a spring biased wedge can be released so as to force the setting means with associated cam stop into a timer valve closed position. This is just one example of a dual gas timer and temperature of the present invention.

The sensor wire W can include a plug in head which is received in a reception cavity in the housing which is electronically connected to the solenoid to provide the electrical circuit which is activated when the temperature is reached. Alternatively, an electrical signal such as an one generated by a battery operated thermometer sensing system can be used with an alternate valve closure triggering means such as a small motor adjustment in a trunnion supported ball valve (e.g., overriding or releasing a hand twist countdown device when a preset temperature is reached).

It should be emphasized that the above-described embodiments of the present invention, particularly, and "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the disclosure and the present invention and protected by the following claims.

What is claimed is:

1. A gas flow shut-off system for use with an outdoor cooking apparatus with gas source and burner and cooking vessel support, comprising:
   a gas flow shut-off device, wherein said gas flow shut-off device is placed in line with a flexible gas flow conduit extending between an outlet of the burner and a source of gas from which the gas flow conduit extends;
   a timer in association with said gas flow shut-off device that triggers activity in said gas flow shut-off device upon a predetermined time interval passing, and
   wherein said cooking vessel includes a turkey fryer pot.

2. The system of claim 1 further comprising a temperature sensor probe received within the cooking vessel so as to be in contact with cooking oil within said cooking vessel, and said probe being in sensing communication with said gas flow shut-off device to trigger gas flow shut-off device activity upon sensing a predetermined temperature being reached in the cooking oil.

3. The system of claim 1 wherein said gas flow shut-off device is placed in line at an intermediate location on said gas flow conduit extending between an outlet of the burner and a propane tank representing the source of gas from which the gas flow conduit extends.

4. The system of claim 2 wherein said sensor probe includes a communicator line that extends into communication with the gas flow shut-off device.

5. The system of claim 2 wherein said temperature probe includes a temperature display.

6. The system of claim 2 wherein said temperature probe includes means for clipping onto the cooking vessel.

7. The system of claim 1 wherein said timer has a maximum time setting, that is less than a cooking time for the turkey so as to ensure attentiveness by an operator.

8. The system of claim 7 wherein said timer is an adjustable timer that the operator adjusts to said maximum time setting upon initiation of cooking, and said timer having a reset device that the operator adjusts at least once more to preclude gas flow shut off during the cooking time for the turkey being cooked.

9. The system of claim 1 wherein said timer shares a common housing with said gas flow shut-off device, with said housing being mounted on an intermediate location of said gas flow conduit, and an operator adjusts said timer by adjustment of a timer adjustment device visible on said housing.

10. The system of claim 1 wherein said flexible gas flow conduit includes a gas flow source connector and a gas flow regulator, and said timer and regulator are positioned apart and are positioned between said connector and said burner.

11. The system of claim 1 wherein said timer has a maximum setting of from 15 to 30 minutes.

12. The system of claim 1 further comprising signal means to convey a signal that the timer has activated the gas flow shut-off device.

13. The method of claim 8 wherein the operator adjusts said timer to a maximum setting of from 15 to 30 minutes.

14. A method of cooking a turkey with an outdoor cooking apparatus with gas source, burner, gas flow conduit feeding gas from said gas source to said burner, a cooking vessel and a cooking vessel support, comprising:
   placing a turkey in said cooking vessel with cooking oil and setting a timer associated with a gas flow shut-off device positioned in line with said gas flow conduit, and, prior to a cooking time completion of the turkey, resetting the timer, associated with said shut-off device to ensure attentiveness in an operator of the cooking apparatus.

15. The method of claim 14 further comprising:
   an automated shutting of the gas flow with said gas flow shut-off device upon said timer detecting a predetermined time passing without the operator resetting the timer.

16. The method of claim 15 wherein the operator initially adjusts said timer to said predetermined time at initiation of cooking, and then resets said timer at least once during a cooking of the turkey.

17. The method of claim 16 wherein said gas flow shut-off device includes a gas flow shut-off valve and said timer shares a common housing with said gas flow shut-off valve, and with said housing being mounted on an intermediate location of said gas flow conduit, and the operator adjusts said timer by adjustment of a timer adjustment device visible on said housing.

18. The method of claim 14 wherein said flexible gas flow conduit includes a gas flow source connector and a gas flow regulator, and said timer and regulator are positioned apart and are positioned between said connector and said burner, and an operator adjusts both said regulator and said timer following connection of the gas flow connector to a propane tank representing the source of gas.

19. The method of claim 14 further comprising an operator fastening a temperature probe that is also in communication with said gas flow shut-off device such that said temperature probe is in contact with the cooking oil, and said temperature probe being designed to activate said gas flow shut-off device upon the cooking oil reaching a predetermined temperature if the timer has not already triggered a shut off of the gas flow.

* * * * *